United States Patent
Towal et al.

(10) Patent No.: US 9,549,118 B2
(45) Date of Patent: Jan. 17, 2017

(54) BLINK AND AVERTED GAZE AVOIDANCE IN PHOTOGRAPHIC IMAGES

(71) Applicant: QUALCOMM Incorporated, San Diego, CA (US)

(72) Inventors: Regan Blythe Towal, San Diego, CA (US); Somdeb Majumdar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/520,710

(22) Filed: Oct. 22, 2014

(65) Prior Publication Data
US 2015/0256741 A1 Sep. 10, 2015

Related U.S. Application Data

(60) Provisional application No. 61/950,641, filed on Mar. 10, 2014.

(51) Int. Cl.
*H04N 5/232* (2006.01)
*G06K 9/00* (2006.01)

(52) U.S. Cl.
CPC ...... *H04N 5/23222* (2013.01); *G06K 9/00597* (2013.01); *G06K 9/00604* (2013.01); *H04N 5/23219* (2013.01)

(58) Field of Classification Search
CPC ............ H04N 5/23219; H04N 5/23222; G06K 9/00597; G06K 9/00604
See application file for complete search history.

(56) References Cited

U.S. PATENT DOCUMENTS

| | | | |
|---|---|---|---|
| 6,204,828 B1 * | 3/2001 | Amir | G06F 3/013 345/156 |
| 8,400,532 B2 | 3/2013 | Kim et al. | |
| 8,416,312 B2 | 4/2013 | Matsunaga | |
| 8,482,626 B2 | 7/2013 | Chen et al. | |
| 8,582,835 B2 | 11/2013 | Cavallini | |
| 2004/0170397 A1 | 9/2004 | Ono | |
| 2007/0201724 A1 | 8/2007 | Steinberg | |
| 2010/0254609 A1 * | 10/2010 | Chen | G06K 9/00221 382/195 |
| 2011/0128390 A1 * | 6/2011 | Clark | H04N 5/2251 348/207.1 |
| 2011/0205383 A1 * | 8/2011 | Shah | H04N 5/232 348/222.1 |
| 2012/0081560 A1 | 4/2012 | Park et al. | |
| 2012/0280899 A1 * | 11/2012 | Huhtala | H04N 13/0484 345/156 |

FOREIGN PATENT DOCUMENTS

EP 2096577 A2 9/2009

OTHER PUBLICATIONS

International Search Report and Written Opinion—PCT/US2015/018150—ISA/EPO—May 20, 2015.

* cited by examiner

*Primary Examiner* — Mekonnen Dagnew
(74) *Attorney, Agent, or Firm* — Seyfarth Shaw LLP

(57) ABSTRACT

A method of blink and averted gaze avoidance with a camera includes detecting an averted gaze of a subject and/or one or more closed eyes of the subject in response to receiving an input to actuate a camera shutter. The method also includes scheduling actuation of the camera shutter to a future estimated time period to capture an image of the subject when a gaze direction of the subject is centered on the camera and/or both eyes of the subject are open.

20 Claims, 13 Drawing Sheets

BLINK AND AVERTED GAZE AVOIDANCE IN PHOTOGRAPHIC IMAGES

CROSS-REFERENCE TO RELATED APPLICATION

The present application claims the benefit of U.S. Provisional Patent Application No. 61/950,641, filed on Mar. 10, 2014, and titled "BLINK AND AVERTED GAZE AVOIDANCE IN PHOTOGRAPHIC IMAGES," the disclosure of which is expressly incorporated by reference herein in its entirety.

BACKGROUND

Field

Certain aspects of the present disclosure generally relate to neural system engineering and, more particularly, to systems and methods for blink and averted gaze avoidance in photographic images.

Background

An artificial neural network, which may comprise an interconnected group of artificial neurons (i.e., neuron models), is a computational device or represents a method to be performed by a computational device. Artificial neural networks may have corresponding structure and/or function in biological neural networks. Artificial neural networks, however, may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

In some cases, a photograph may include a subject that is blinking and/or not looking at the camera. Accordingly, it is desirable to capture an image with each subject looking at the camera and also not blinking. Still, it may be difficult to capture a desired image when the image includes a large group of individuals, distracted individuals, young children, and/or individuals that may be actively avoiding the camera. Neural networking techniques may be employed to address these issues.

SUMMARY

In one aspect of the present disclosure, a method of blink and averted gaze avoidance with a camera is disclosed. The method includes detecting the averted gaze of a subject and/or one or more closed eyes of the subject in response to receiving an input to actuate a camera shutter. The method also includes scheduling actuation of the camera shutter to a future estimated time period to capture an image of the subject when a gaze direction of the subject is centered on the camera and/or both eyes of the subject are open.

Another aspect of the present disclosure is directed to an apparatus including means for detecting the averted gaze of a subject and/or one or more closed eyes of the subject in response to receiving an input to actuate a camera shutter. The apparatus also includes means for scheduling actuation of the camera shutter to a future estimated time period to capture an image of the subject when a gaze direction of the subject is centered on the camera and/or both eyes of the subject are open.

In another aspect of the present disclosure, a computer program product for blink and averted gaze avoidance with a camera is disclosed. The computer program product has a non-transitory computer-readable medium with non-transitory program code recorded thereon. The program code includes program code to detect the averted gaze of a subject and/or one or more closed eyes of the subject in response to receiving an input to actuate a camera shutter. The program code also including program code to schedule actuation of the camera shutter to a future estimated time period to capture an image of the subject when a gaze direction of the subject is centered on the camera and/or both eyes of the subject are open.

Another aspect of the present disclosure is directed to an apparatus configured for blink and averted gaze avoidance having a memory and one or more processors coupled to the memory. The processor(s) is configured to detect the averted gaze of a subject and/or one or more closed eyes of the subject in response to receiving an input to actuate a camera shutter. The processor(s) is also configured to schedule actuation of the camera shutter to a future estimated time period to capture an image of the subject when a gaze direction of the subject is centered on the camera and/or both eyes of the subject are open.

In one aspect of the present disclosure, a method of blink and averted gaze avoidance with a camera is disclosed. The method includes actuating a camera shutter to capture a burst of images when the averted gaze of a subject and/or one or more closed eyes of the subject is detected after receiving an input to actuate the camera shutter. The method also includes storing one or more images from the burst of images having a gaze direction of the subject centered on the camera and having both eyes of the subject open.

Another aspect of the present disclosure is directed to an apparatus including means for actuating a camera shutter to capture a burst of images when the averted gaze of a subject and/or one or more closed eyes of the subject is detected after receiving an input to actuate the camera shutter. The apparatus also includes means for storing one or more images from the burst of images having a gaze direction of the subject centered on the camera and having both eyes of the subject open.

In another aspect of the present disclosure, a computer program product for blink and averted gaze avoidance with a camera is disclosed. The computer program product has a non-transitory computer-readable medium with non-transitory program code recorded thereon. The program code includes program code to actuate a camera shutter to capture a burst of images when the averted gaze of a subject and/or one or more closed eyes of the subject is detected after receiving an input to actuate the camera shutter. The program code also including program code to store one or more images from the burst of images having a gaze direction of the subject centered on the camera and having both eyes of the subject open.

Another aspect of the present disclosure is directed to an apparatus configured for blink and averted gaze avoidance having a memory and one or more processors coupled to the memory. The processor(s) is configured to actuate a camera shutter to capture a burst of images when the averted gaze of a subject and/or one or more closed eyes of the subject is detected after receiving an input to actuate the camera shutter. The processor(s) is also configured to store one or more images from the burst of images having a gaze direction of the subject centered on the camera and having both eyes of the subject open.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
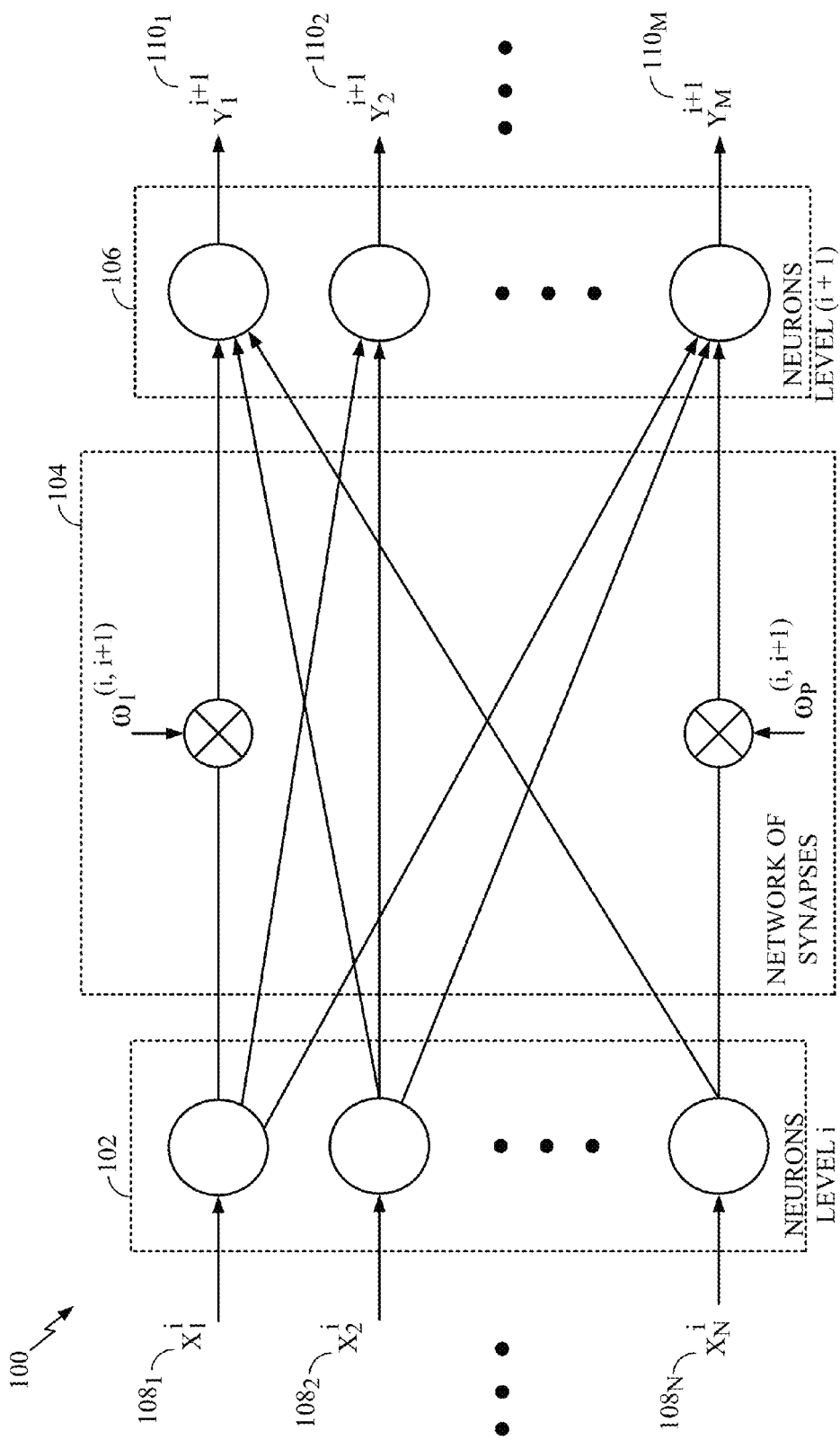
FIG. 1 illustrates an example network of neurons in accordance with certain aspects of the present disclosure.

FIG. 1 illustrates an artificial neural system 100 with multiple levels of neurons in accordance with certain aspects of the present disclosure. The neural system 100 may have a level of neurons 102 coupled to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may couple to other neurons of the same layer through lateral connections. Furthermore, some of the neurons may couple back to a neuron of a previous layer through feedback connections.

As illustrated in FIG. 1, each neuron in the level 102 may receive an input signal 108 is generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike that is transferred to the next level of neurons (e.g., the level 106). In some modeling approaches, the neuron may continuously transfer a signal to the next level of neurons. This signal is typically a function of the membrane potential. Such behavior can be simulated in hardware and/or software, including analog and digital implementations such as those described below.

In biological neurons, an action potential is the output spike that is generated when a neuron fires. This electrical signal is a relatively rapid, transient, nerve impulse, having an amplitude of roughly 100 mV and a duration of about 1 ms. In one configuration of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to on other spike or spikes. The importance of the spike may be determined by a weight applied to a connection between neurons, as explained below.

The transfer of spikes from one level of neurons to another may be achieved through a network of synaptic connections (or simply "synapses") 104, as illustrated in FIG. 1. Relative to the synapses 104, neurons of level 102 may be considered presynaptic neurons and neurons of level 106 may be considered postsynaptic neurons. The synapses 104 may receive output signals (i.e., spikes) from the neurons of level 102 and scale those signals according to adjustable synaptic weights $w_1^{(i,i+1)}, \ldots, w_P^{(i,i+1)}$, where P is a total number of synaptic connections between the neurons of levels 102 and 106, and i is an indicator of the neuron level. In the example of FIG. 1, i represents the neuron level 102, and i+1 represents the neuron level 106. Further, the scaled signals may be combined as an input signal of each neuron in the level 106. Every neuron in the neuron level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (e.g., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the desired behavior.

The neural system 100 may be simulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memory resistor (memristor) element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
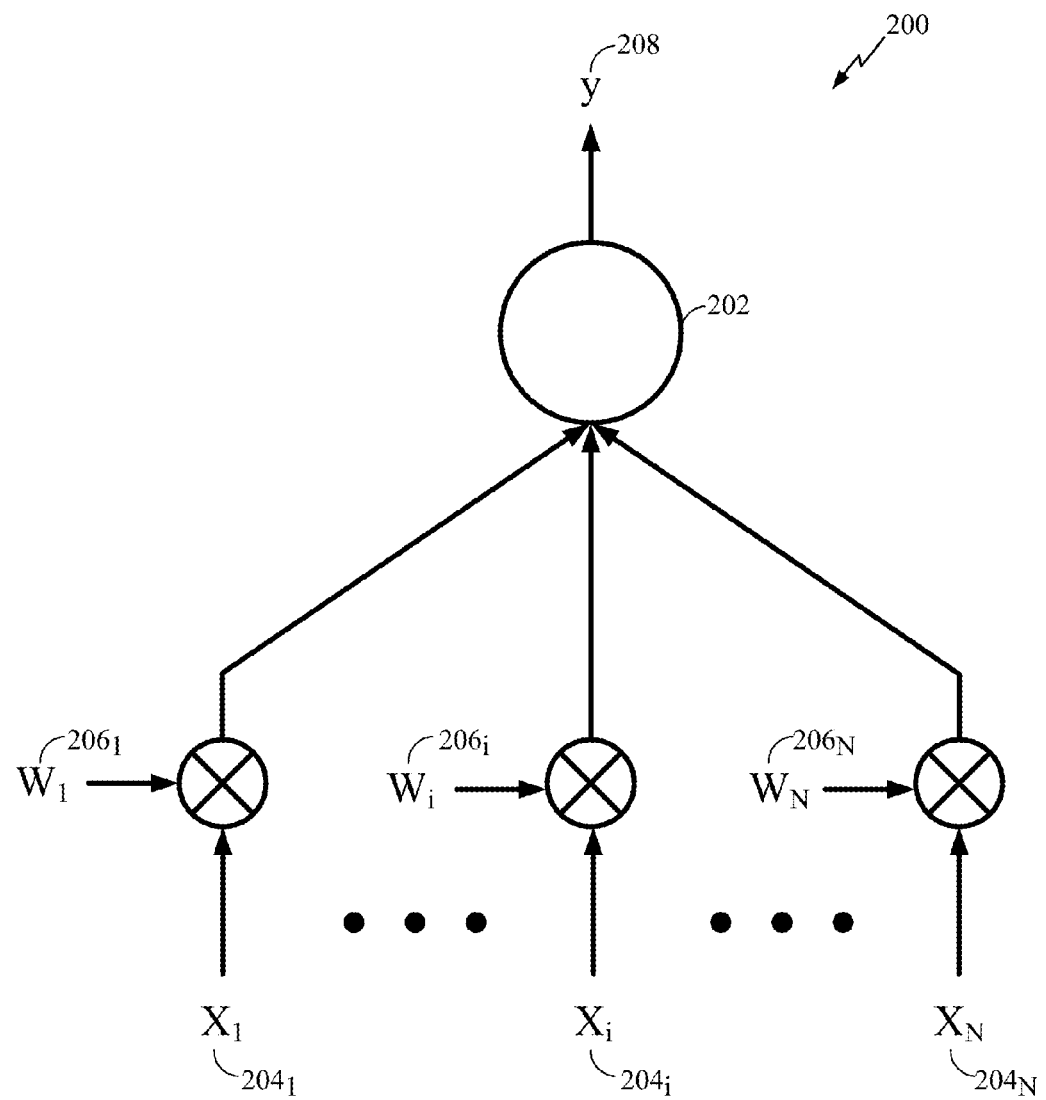
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$, which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit

202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may be non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not use plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) s structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the postsynaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to an insignificant level.

Figure 3:
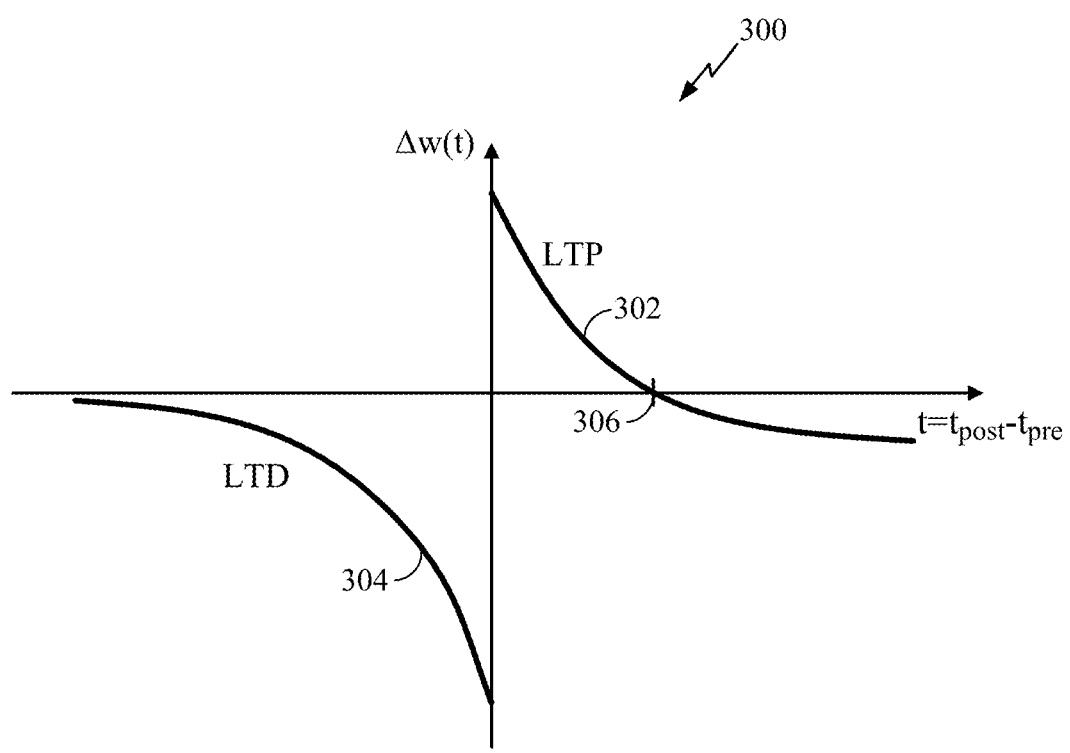
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of presynaptic and postsynaptic spikes in accordance with the STDP. If a presynaptic neuron fires before a postsynaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between presynaptic and postsynaptic spike times. The reverse order of firing may reduce the synaptic weight, as illustrated in a portion 304 of the graph 300, causing an LTD of the synapse.

As illustrated in the graph 300 in FIG. 3, a negative offset µ may be applied to the LTP (causal) portion 302 of the STDP graph. A point of cross-over 306 of the x-axis (y=0) may be configured to coincide with the maximum time lag for considering correlation for causal inputs from layer i-1. In the case of a frame-based input (i.e., an input that is in the form of a frame of a particular duration comprising spikes or pulses), the offset value u can be computed to reflect the frame boundary. A first input spike (pulse) in the frame may be considered to decay over time either as modeled by a postsynaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset µ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

Figure 4:
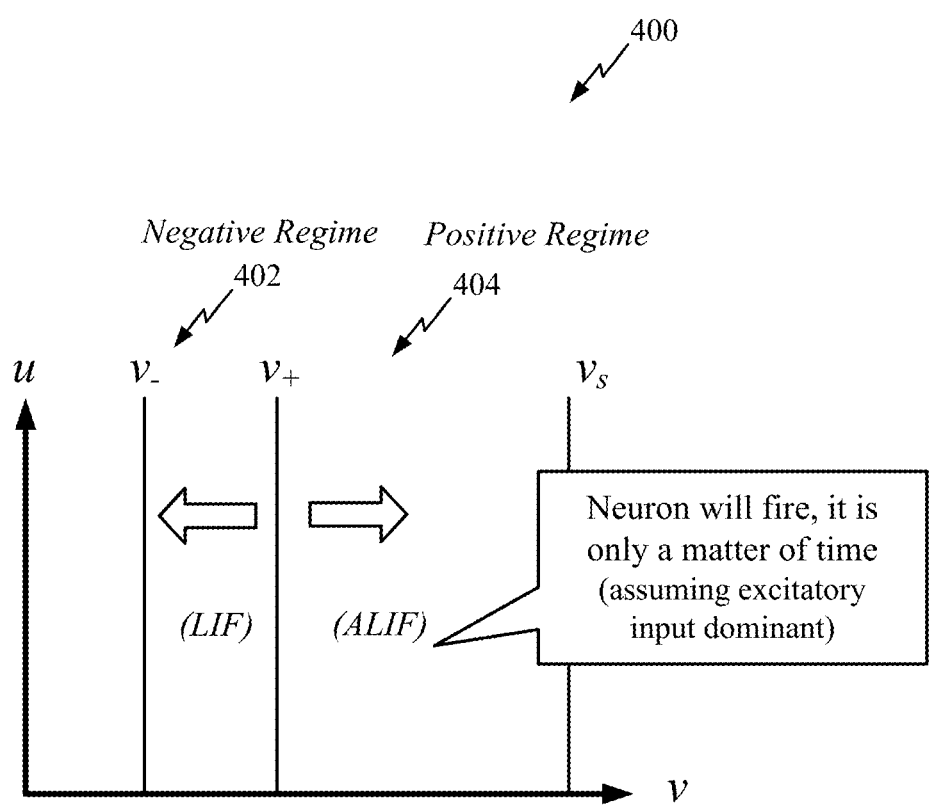
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily utilize iterative methods or Numerical methods. An event-based implementation is also possible at a limited time resolution in a step-based simulator by only updating the model if an event occurs at or between steps or by "step-event" update.

Blink and Averted Gaze Avoidance

Aspects of the present disclosure are directed to mitigating blinks and averted gazes in captured images. Such processing may be implemented with a neural network.

In some cases, a photograph may include a subject that is blinking and/or not looking at the camera. Accordingly, it is desirable to capture an image with each subject looking at the camera and also not blinking. Still, it may be difficult to capture a desired image when the image includes a large group of individuals, distracted individuals, young children, and/or individuals that may be actively avoiding the camera.

In the present application, a desired image refers to an image of one or more subjects that are not blinking and are also looking at the camera. Of course, aspects of the present application are not limited to an image in which all subjects are not blinking and looking at the camera. Aspects are also contemplated for a threshold to capture an image when a number of subjects are not blinking and also looking at the camera. For example, in a group photograph, the image may be captured when a threshold percentage, such as eighty percent, of the subjects in the image are looking at the camera and not blinking.

In some cases, a photographer captures multiple images and manually searches the captured images to select one or more images with each subject looking towards the camera and also not blinking. Additionally, or alternatively, images with blinking subjects may be corrected with post-processing applications. Moreover, some cameras include a burst mode for capturing multiple images in a short duration. Still, in a conventional camera, all of the images captured during the burst mode are stored in memory for post-processing or user selection. That is, conventional cameras capture multiple images that are post-processed and/or manually selected to obtain a desirable image including subjects that are not blinking and do not have an averted gaze.

Thus, aspects of the present disclosure are directed to automatically determining whether a subject is blinking and/or has an averted gaze and adjusting the timing of the camera shutter to capture an image when a subject is looking at the camera without blinking. In one configuration, the determining of a blink or averted gaze is processed in real time. Furthermore, in one configuration, the time adjustment is based on an estimated time when a subject is looking at the camera without blinking.

Neural networks may perform machine learning and object recognition. Specifically, neural networks may recognize facial features and perform iris detection to determine when a subject has a camera centered gaze and is also not blinking. The neural networks may include one or more feature extraction layers followed by a learning layer to enable blink and averted gaze avoidance in captured images. In one example, nodes, such as neurons, in each layer may encode features in the form of a temporal features pattern.

Aspects of the present disclosure are directed to blink avoidance and averted gaze avoidance in photographic images. In one configuration, the blink detection analysis and gaze direction analysis estimate a time to schedule the shutter of the camera so that a blink-free and camera-centered gaze is captured for the one or more subjects in a photo. The camera-centered gaze refers to the gaze of a subject that is looking towards the camera.

In some cases, facial detection may determine the presence and/or location of a face to initiate iris detection. Blink detection may be based on the iris detection and may determine whether two irises are detected in a face. In one configuration, gaze direction is determined by co-registering the face location and the iris location. According to an aspect of the present disclosure, the shutter actuates when a blink is not detected and the gaze is towards the camera. Alternatively, if a blink and/or an averted gaze is/are detected, the shutter may be scheduled to actuate at an estimated time in the future to capture the image. The estimated time may be based on a time determined for an average blink and/or an average time of a diverted gaze. In one configuration, the camera determines if a blink and/or diverted gaze is/are present before capturing the image after the estimated time has lapsed. That is, before the shutter is scheduled to open, the blink detection may be executed to determine that a blink and/or diverted gaze is/are no longer present.

As previously discussed, the camera may periodically check for gaze direction. Additionally or alternatively, a future gaze direction may be predicted based on prior gaze location information so that the shutter is scheduled for an estimated time when the gaze will be towards the camera. Moreover, in some cases, time delays may not be desirable. Therefore, the camera may be configured to capture multiple images within a time period, such as in burst mode, when a blink and/or a gaze is/are detected. In one configuration, the burst mode is automatically activated without a user input for capturing multiple images within a time period. Furthermore, in one configuration, automatic face and iris detection is performed on the captured images to automatically delete temporarily stored images with blinks and/or averted gazes. That is, the camera may only save blink-free and camera-centered gaze images.

As previously discussed, aspects of the present disclosure may be specified to capture and/or store blink-free and/or camera-centered gaze images based on real-time blink detection and/or gaze detection. Accordingly, aspects of the present disclosure mitigate storage of redundant images and improve the storage space for devices, such as smart phones.

Figure 5:
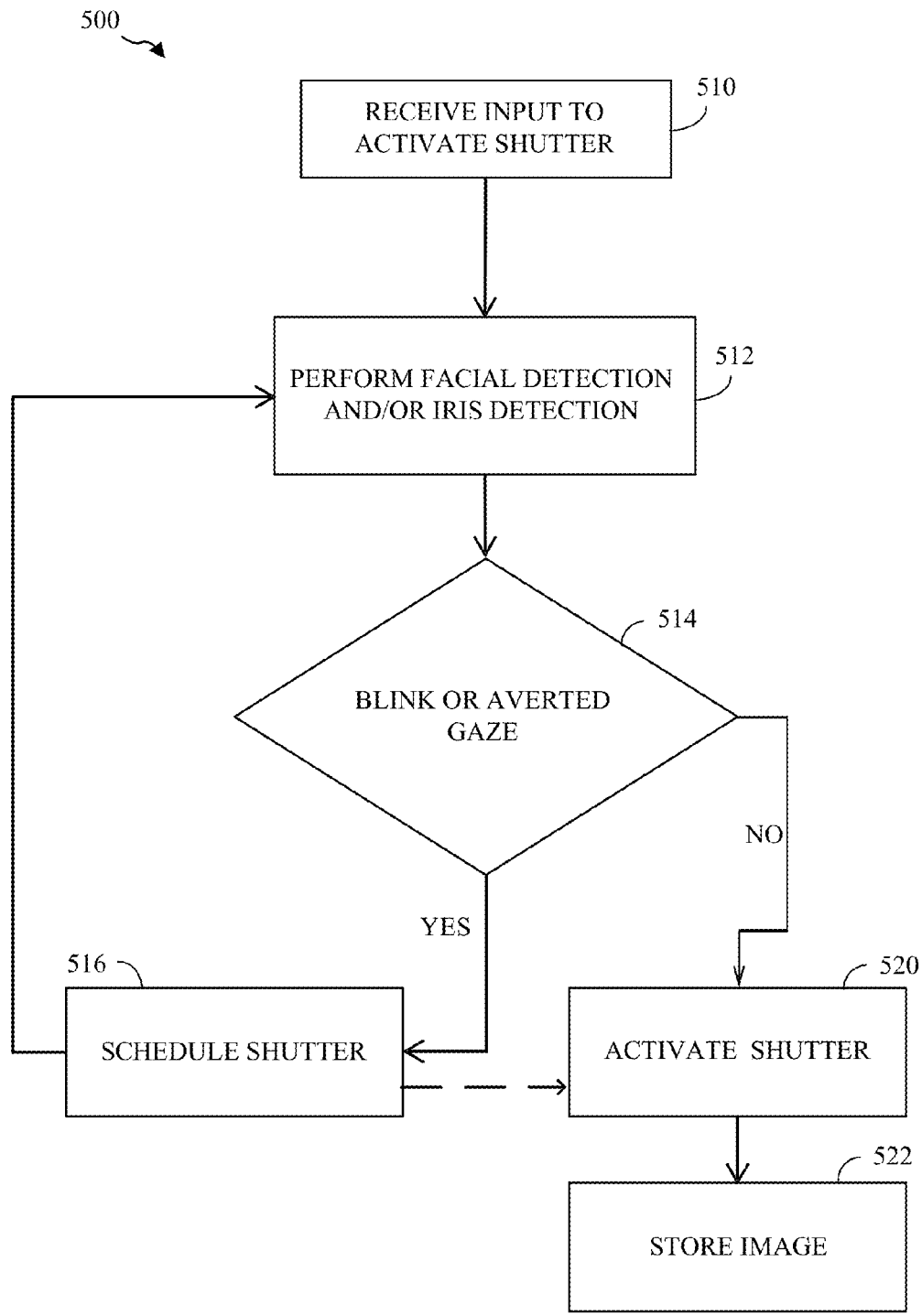
FIG. 5 is a flow diagram further illustrating the method of blink and averted gaze avoidance in accordance with aspects of the present disclosure.

FIG. 5 is a flow diagram illustrating a method 500 of blink avoidance and averted gaze avoidance in accordance with aspects of the present disclosure. As shown in FIG. 5, at block 510, an input is received to actuate a shutter of a camera. The input may be an external input, such as a user input, or an internal input, such as a camera timer. Furthermore, at block 512, facial detection and/or iris detection is/are initiated in response to the input received at block 510. For example, facial detection may be triggered to determine a facial location of the subjects in view of the camera. Additionally, iris detection may be performed in response to detection of the facial location. At block 514, the device determines whether a blink and/or an averted gaze is/are detected. The blink and/or averted gaze may be detected based on the iris detection. Furthermore, when a blink and/or averted gaze is/are detected, at block 514, the camera shutter is scheduled to actuate at a future time at block 516. For example, the future time may be an estimated time period based on an estimated time when the gaze direction of the subjects is towards the camera and when the eyes of the each subject are open.

Additionally, after scheduling the shutter to actuate at a future time at block 516 the facial detection and iris detection of block 512 and/or blink or averted gaze detection of block 514 are performed until the subjects are not blinking and/or are also looking toward the camera. That is, the process of blocks 512, 514, and 516 are performed until a desirable image is captured. Accordingly, when a blink and averted gaze is not detected, the camera shutter is actuated to capture an image of the subjects at block 520. Furthermore, at block 522, the image is stored. In this configuration, the timing of the shutter actuation is adjusted in real-time to capture the moment when subjects are gazing at the camera without blinking.

According to another aspect of the present disclosure, after scheduling the estimated future time at block 516, when the estimated future time is reached, the shutter of the camera may be activated at block 520 to capture the image. That is, in this configuration, the camera does not perform a subsequent facial detection and iris detection prior to capturing the image. Furthermore, at block 522, the image is stored.

As previously discussed, a subject may be blinking even when their gaze is towards the camera. Therefore, actuation of the camera shutter may be delayed for an estimated time period so that the image is captured when the subject is not blinking. The estimated time period may be based on an estimated blink time and/or averted gaze time. Furthermore, the estimated times may be based on learned timing for the blink and/or averted gaze. For example, an average blink length may be eight-hundred milliseconds. Thus, in this example the estimated time period may be set to time that is greater than eight-hundred milliseconds, such as one-thousand milliseconds.

Figure 6:
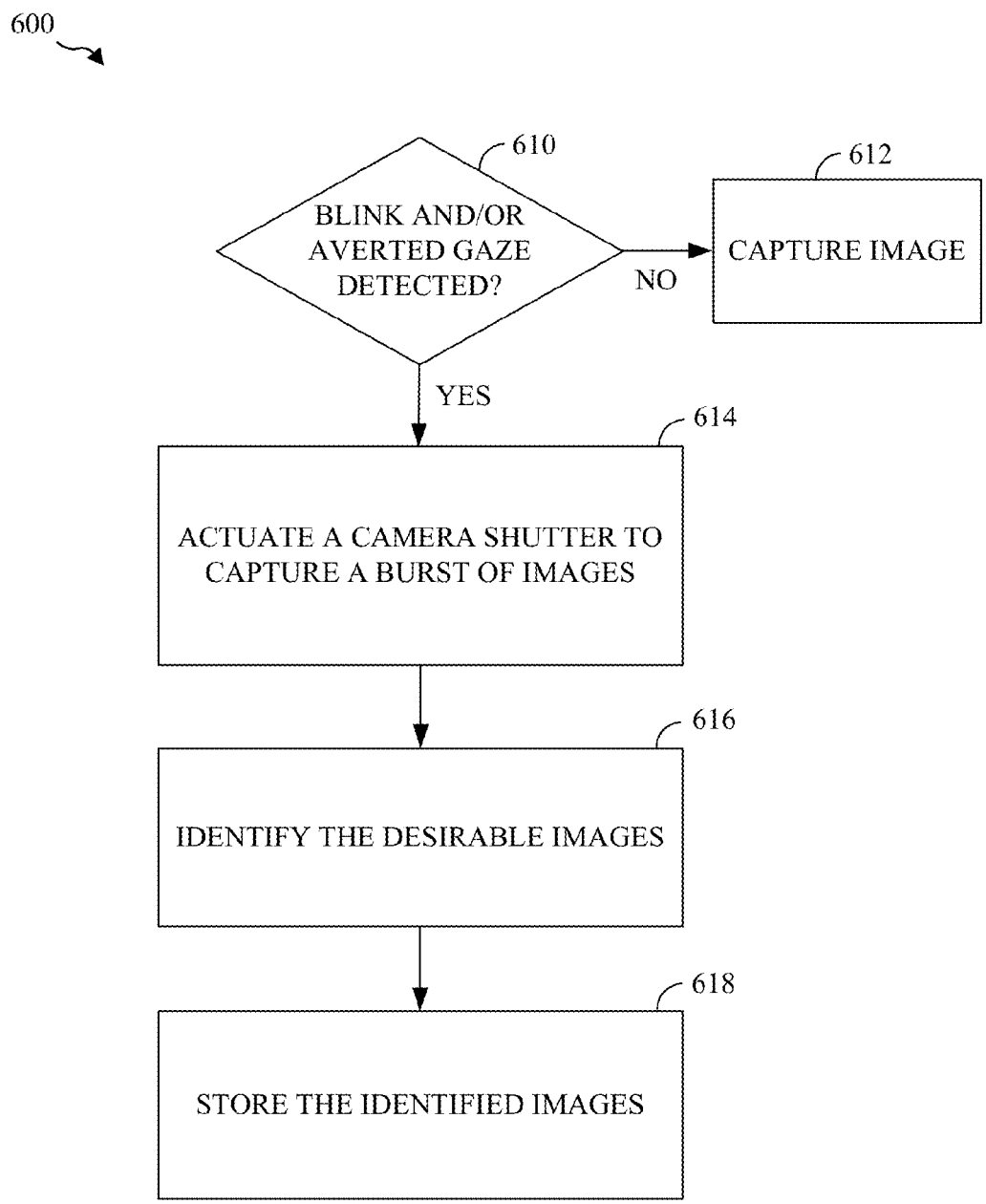
FIG. 6 is a flow diagram illustrating a method of blink and averted gaze avoidance in images in accordance with aspects of the present disclosure.

FIG. 6 illustrates a method 600 of blink and averted gaze avoidance in photographic images in accordance with an aspect of the present disclosure. As shown in FIG. 6, at block 610, an image capturing device determines whether a blink and/or an averted gaze of one or more subjects is detected. Moreover, at block 612, an image of the subjects is captured when the subjects are gazing at the camera without blinking. Alternatively, at block 614, a camera shutter is actuated to capture multiple images of the subjects. Furthermore, at block 616, desirable images are identified from the captured images. The desirable images may be images with one or more subjects gazing at the camera without blinking. For example, a neural network may be trained to recognize features of an averted gaze as well as perform iris detection to identify the images in which the subjects are gazing at the camera without blinking. Finally, at block 618 the desirable images are stored. Furthermore, images with subjects having an averted gaze and/or blinking eyes are deleted to reduce the storage of undesirable images.

Figure 7:
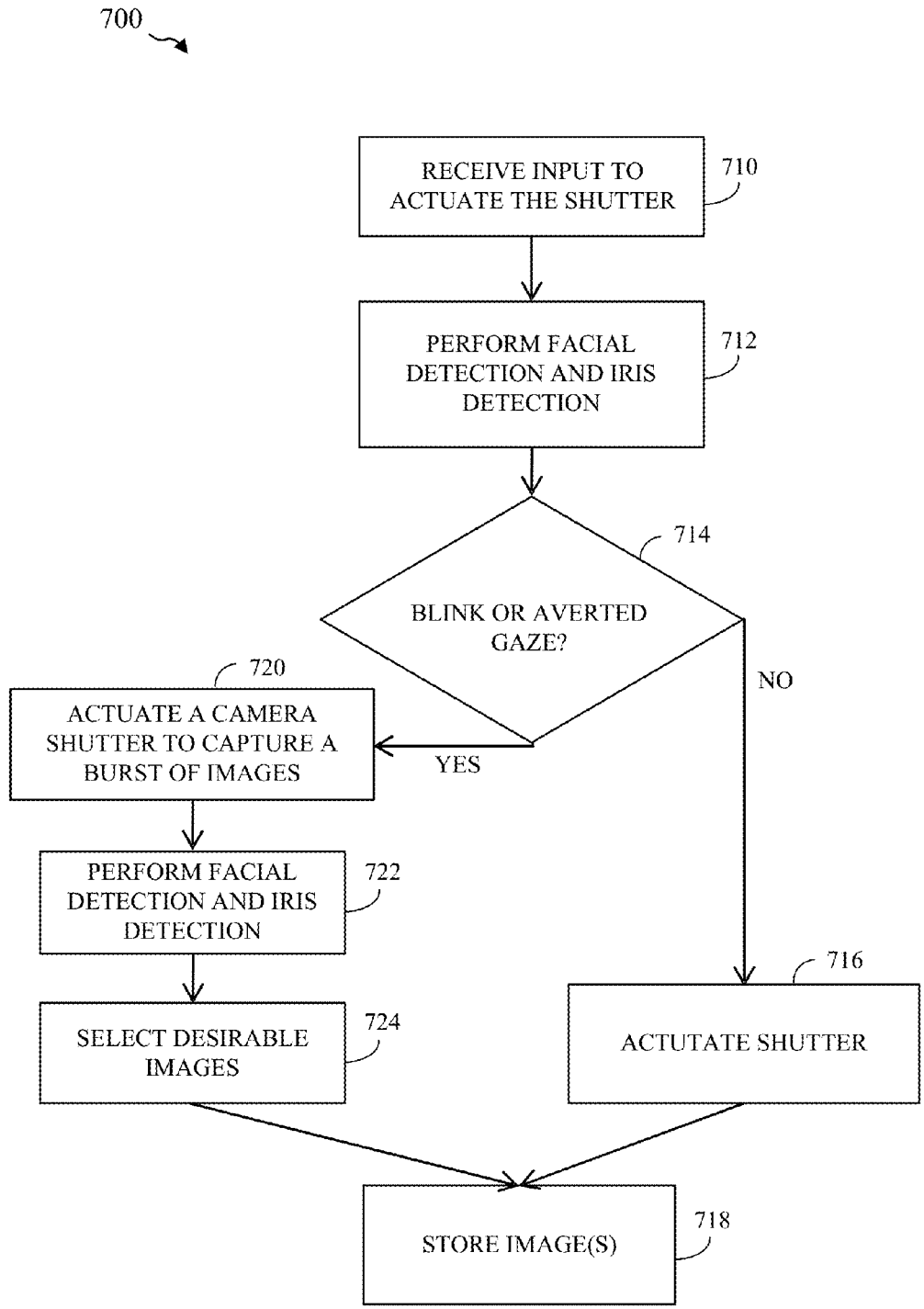
FIG. 7 is a block diagram further illustrating the method of blink and averted gaze avoidance in images in accordance with aspects of the present disclosure.

FIG. 7 illustrates a method 700 for blink and averted gaze mitigation in stored images according to an aspect of the present disclosure. As shown in FIG. 7, at block 710, an input is received to actuate a shutter of a camera. The input may be an external input, such as a user input, or an internal input, such as a camera timer. Furthermore, at block 712, facial detection and/or iris detection is/are initiated in response to the input received at block 710. For example, facial detection may be triggered to determine a facial location of the subjects in view of the camera. Moreover, iris detection may be performed in response to detection of the facial location. Additionally or alternatively, facial recognition and iris detection may be activated when facial movement of the subject is detected. At block 714, the camera determines whether a blink and/or an averted gaze is/are detected. The blink and/or averted gaze may be detected based on the iris detection. When a blink or averted gaze is detected at block 714, a camera shutter is actuated N times to capture a burst of images of the subjects, at block 720. Additionally, at block 722, face and iris detection is performed to discard images so that desirable images can be identified from the captured burst of images at block 724. The desirable images may be images with one or more subject(s) gazing at the camera without blinking. Finally, at block 718, the desirable images are stored. Alternatively, when a blink and averted gaze are not detected, the camera shutter is actuated at block 716 to capture an image. Furthermore, after capturing the image, the image is stored at block 718.

Figure 8:
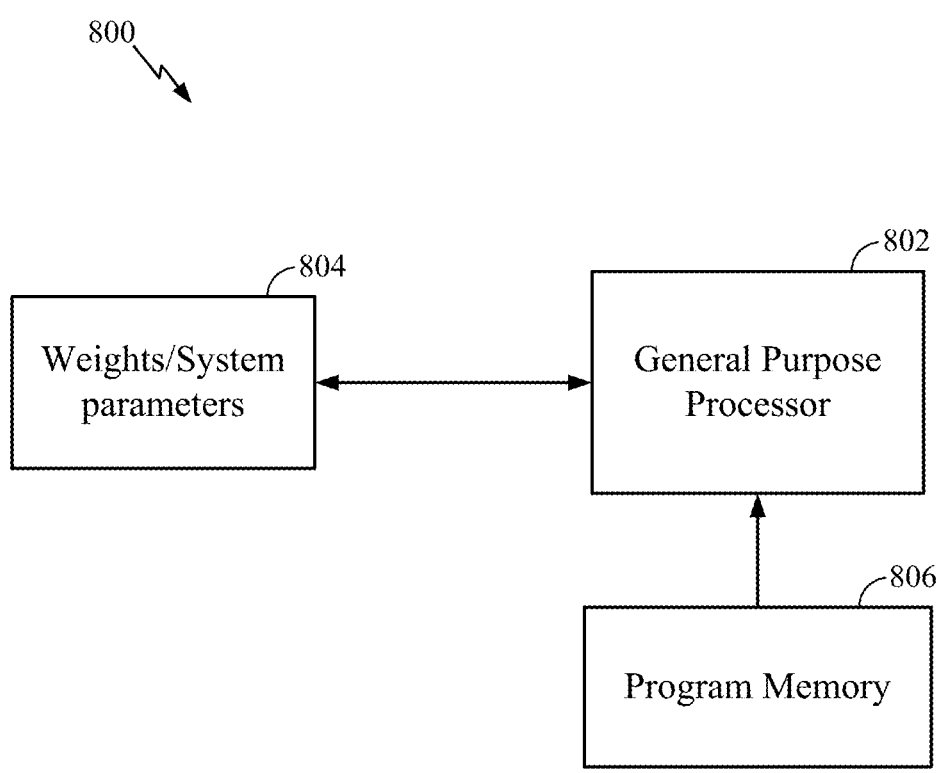
FIG. 8 illustrates an example implementation of designing a neural network using a general-purpose processor in accordance with certain aspects of the present disclosure.

FIG. 8 illustrates an example implementation 800 of the aforementioned blink and averted gaze avoidance in photographic images using a general-purpose processor 802 in accordance with certain aspects of the present disclosure. Variables (neural signals), synaptic weights, system parameters associated with a computational network (neural network), delays, frequency bin information, spike latency information, and histogram information may be stored in a memory block 804, while instructions executed at the general-purpose processor 802 may be loaded from a program memory 806. In an aspect of the present disclosure, the instructions loaded into the general-purpose processor 802 may comprise code for blink and averted gaze avoidance.

Figure 9:
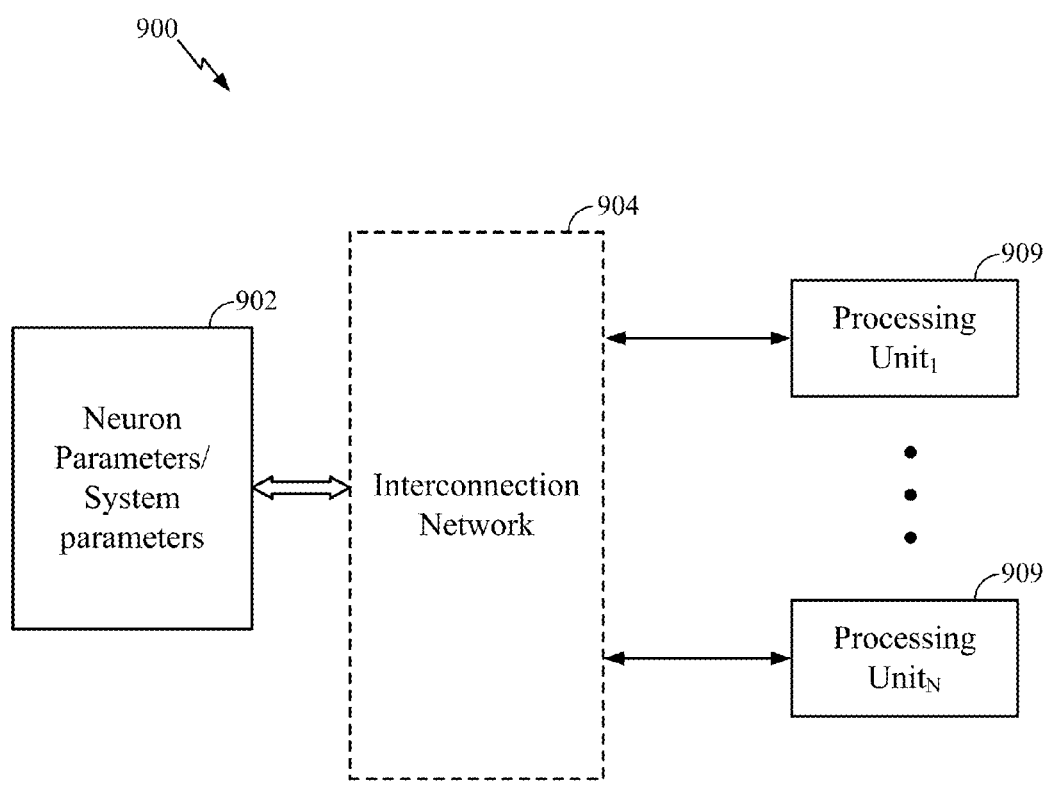
FIG. 9 illustrates an example implementation of designing a neural network where a memory may be interfaced with individual distributed processing units in accordance with certain aspects of the present disclosure.

FIG. 9 illustrates an example implementation 900 of the aforementioned blink and averted gaze avoidance in photographic images where a memory 902 can be interfaced via an interconnection network 904 with individual (distributed) processing units (neural processors) 909 of a computational network (neural network) in accordance with certain aspects of the present disclosure. Variables (neural signals), synaptic weights, system parameters associated with the computational network (neural network) delays, frequency bin information, and histogram information, may be stored in the memory 902, and may be loaded from the memory 902 via connection(s) of the interconnection network 904 into each processing unit (neural processor) 909. In an aspect of the present disclosure, the processing unit 909 may be configured to provide blink and averted gaze avoidance in photographic images.

Figure 10:
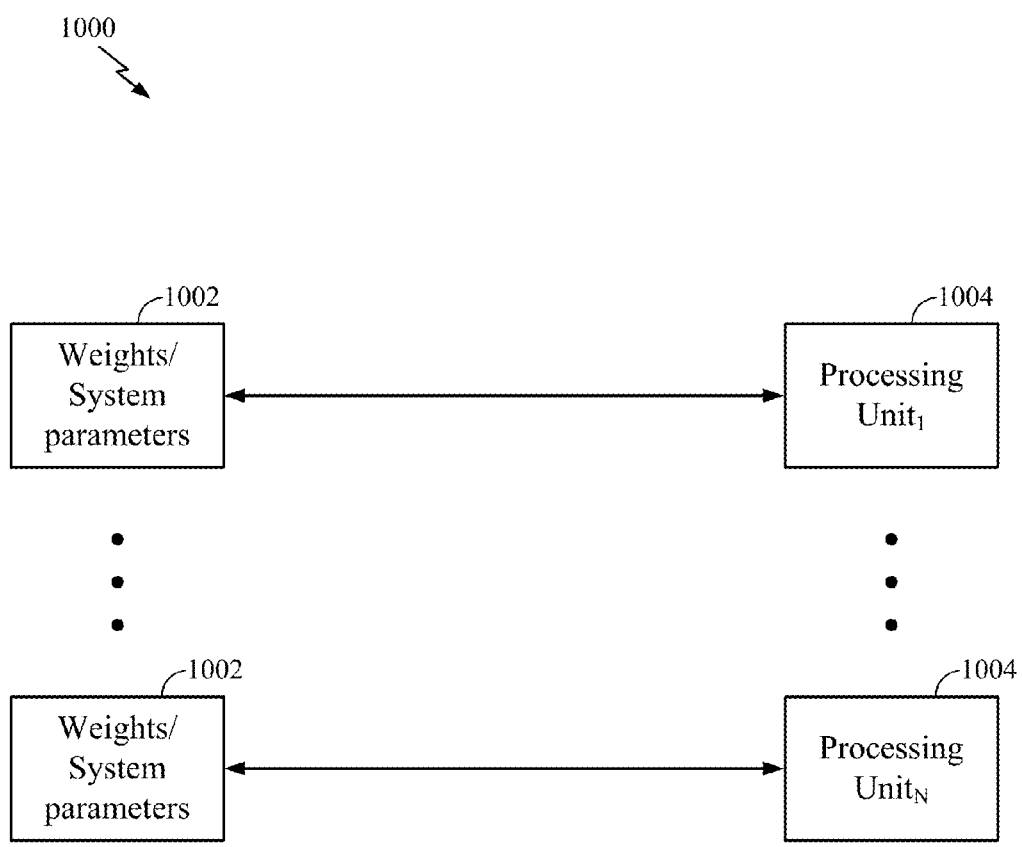
FIG. 10 illustrates an example implementation of designing a neural network based on distributed memories and distributed processing units in accordance with certain aspects of the present disclosure.

FIG. 10 illustrates an example implementation 1000 of the aforementioned blink and averted gaze avoidance in photographic images. As illustrated in FIG. 10, one memory bank 1002 may be directly interfaced with one processing unit 1004 of a computational network (neural network). Each memory bank 1002 may store variables (neural signals), synaptic weights, and/or system parameters associated with a corresponding processing unit (neural processor) 1004 delays, frequency bin information, and histogram information. In an aspect of the present disclosure, the processing unit 1004 may be configured to provide facial recognition and iris detection of a subject, and/or transform a subject representation to a canonical form based on a reference feature.

Figure 11:
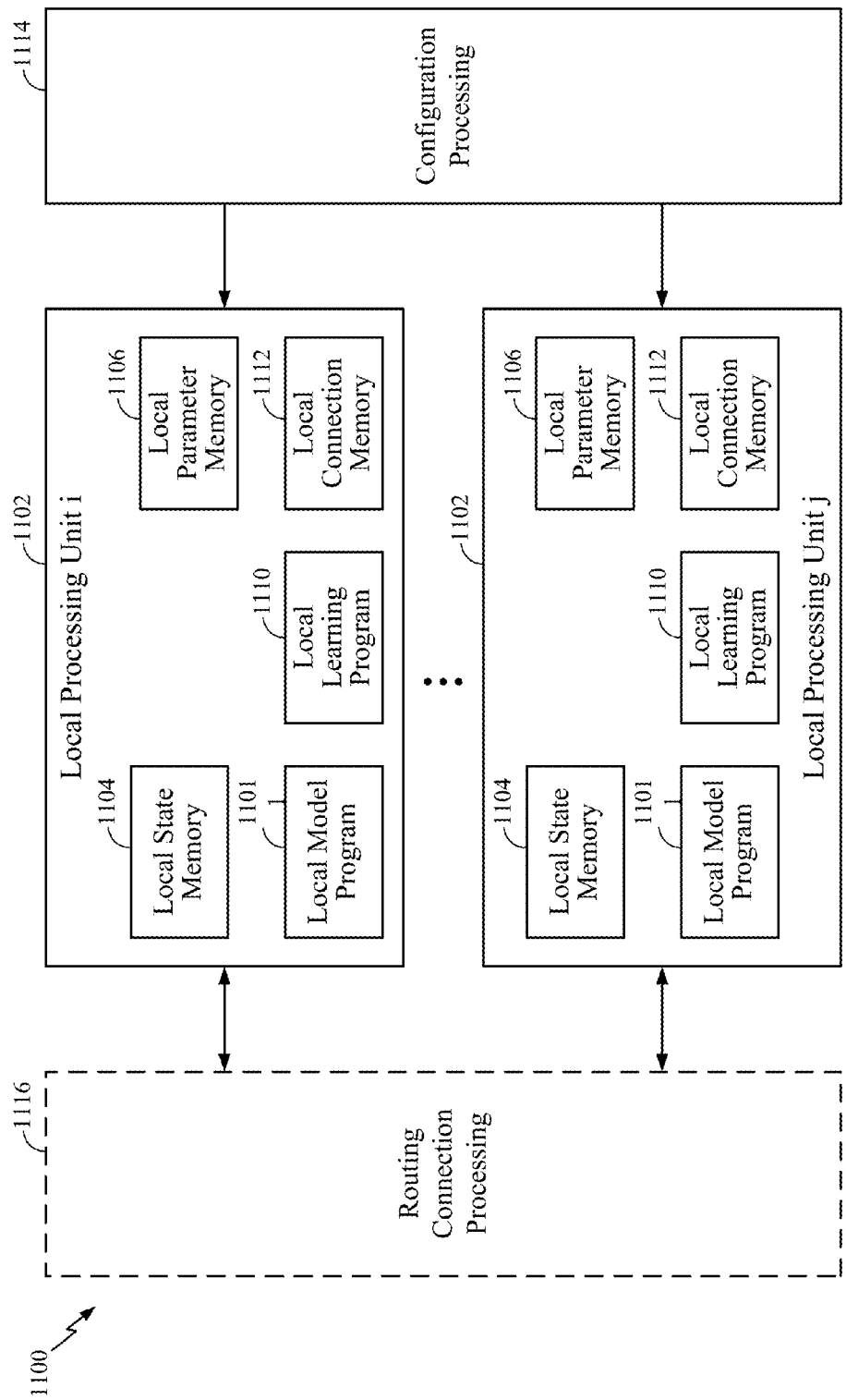
FIG. 11 illustrates an example implementation of a neural network in accordance with certain aspects of the present disclosure.

FIG. 11 illustrates an example implementation of a neural network 1100 configured to provide blink and averted gaze avoidance in photographic images in accordance with certain aspects of the present disclosure. As illustrated in FIG. 11, the neural network 1100 may have multiple local processing units 1102 that may perform various operations of methods described herein. Each local processing unit 1102 may comprise a local state memory 1104 and a local parameter memory 1106 that store parameters of the neural network. In addition, the local processing unit 1102 may have a local (neuron) model program (LMP) memory 1110 for storing a local model program, a local learning program (LLP) memory 1110 for storing a local learning program, and a local connection memory 1112. Furthermore, as illustrated in FIG. 11, each local processing unit 1102 may be interfaced with a configuration processor unit 1114 for providing configurations for local memories of the local processing unit, and with a routing connection processing unit 1116 that provide routing between the local processing units 1102.

In one configuration, a neuron model is configured for blink and averted gaze avoidance in photographic images. The neuron model includes detecting means and scheduling means. In one aspect, the detecting means, and/or scheduling means may be the general-purpose processor 802, program memory 806, memory block 804, memory 902, interconnection network 904, processing units 909, processing unit 1004, local processing units 1102, and or the routing connection processing units 1116 configured to perform the functions recited. In another configuration, the aforementioned means may be any module or any apparatus configured to perform the functions recited by the aforementioned means.

In another configuration, a neuron model is configured for blink and averted gaze avoidance in photograph images. The neuron model includes activating means and storing means. In one aspect, the activating means and/or the storing means may be the general-purpose processor 802, program memory 806, memory block 804, memory 902, interconnection network 904, processing units 909, processing unit 1004, local processing units 1102, and or the routing connection processing units 1116 configured to perform the functions recited. In another configuration, the aforementioned means may be any module or any apparatus configured to perform the functions recited by the aforementioned means.

According to certain aspects of the present disclosure, each local processing unit 1102 may be configured to determine parameters of the neural network based upon desired one or more functional features of the neural network, and develop the one or more functional features towards the desired functional features as the determined parameters are further adapted, tuned and updated.

Figure 12:
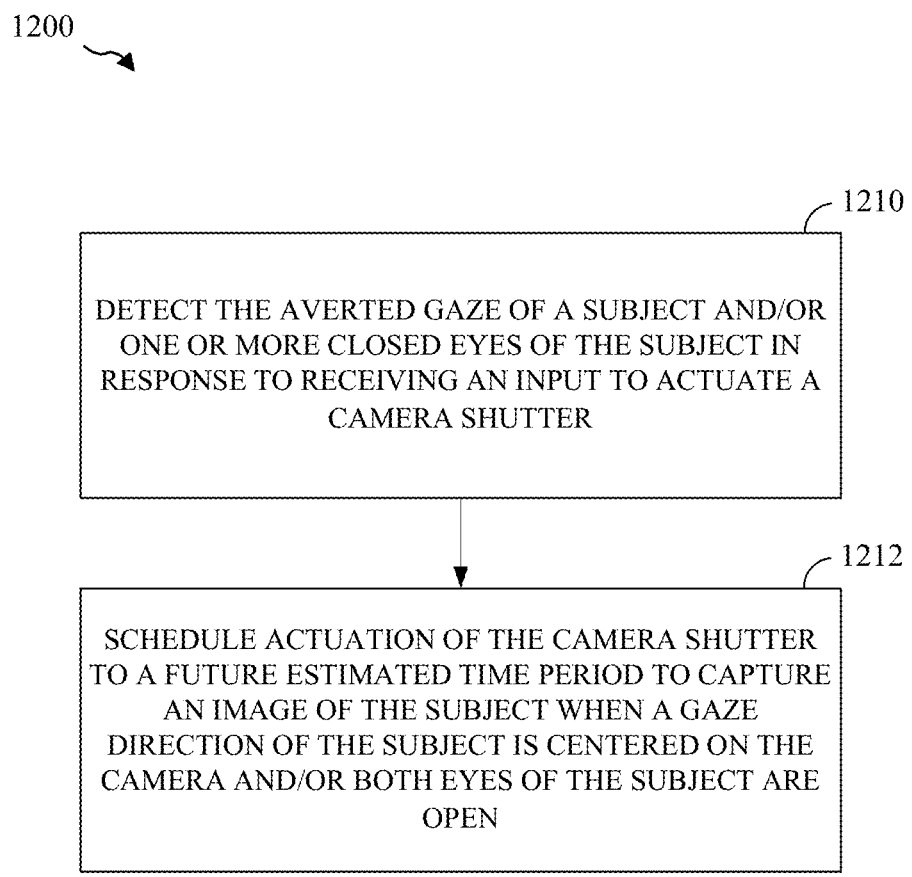
FIGS. 12 and 13 are flow diagrams illustrating a method of blink and averted gaze avoidance in accordance with aspects of the present disclosure.

FIG. 12 is a flow diagram illustrating a method 1200 of blink avoidance and averted gaze avoidance in accordance with aspects of the present disclosure. As shown in FIG. 12, at block 1210, a camera detects an averted gaze and/or one or more closed eyes of a subject in response to receiving an input to actuate a camera shutter. For example, a neural network may be trained to provide facial recognition and iris detection to identify a blink or an averted gaze. Moreover, at block 1212, the camera schedules an actuation of the camera shutter to a future estimated time period to capture an image of the subject when a gaze direction of the subject is centered and/or both eyes of the subject are open. For example, the neural network may be trained to estimate the future time period in which the gaze direction of the subjects is towards the camera. The neural network may schedule the camera shutter to actuate during the approximated, future time period. Additionally, or alternatively, the neural network may perform an additional blink and/or gaze check prior to capturing the image when the estimated future time has lapsed. Furthermore, delaying, during the future estimated time period may be delayed or adjusted if a subsequent blink and/or averted gaze is/are detected during the future estimated time period.

Figure 13:
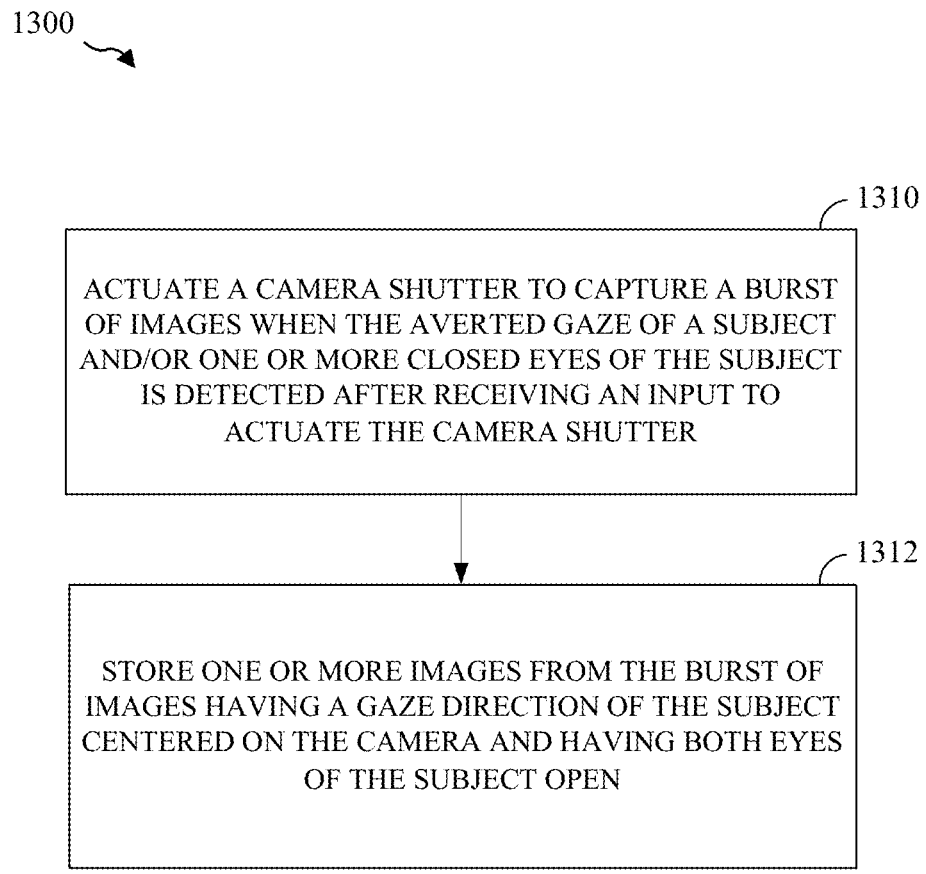

FIG. 13 is a flow diagram illustrating a method 1300 of blink avoidance and averted gaze avoidance in accordance with aspects of the present disclosure. As shown in FIG. 13, at block 1310, a camera actuates a shutter to capture a burst of images when the averted gaze of the subject is detected and/or one or more of the subject's eyes are closed. The averted gaze and/or closed eye detection may be performed after receiving an input to actuate the camera shutter and prior to capturing the image. Moreover, at block 1312, the camera stores one or more one image from the burst of images having a gaze direction of the subject centered on the camera and having both eyes of the subject open.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of a blink and averted gaze avoidance with a camera, comprising:
   detecting an averted gaze of a subject and/or at least one closed eye of the subject, in response to receiving an input to actuate a camera shutter; and
   scheduling an actuation of the camera shutter to a future estimated time period based on an estimate of when a gaze direction of the subject will be centered on the camera and/or both eyes of the subject will be open, the future estimated time period provided by an artificial neural network trained on blink timing and/or averted gaze timing;
   determining, at the future estimated time period, whether the subject has at least one closed eye; and
   delaying, at the future estimated time period, the actuation of the camera shutter for a predetermined period of time when the subject has the at least one closed eye.

2. The method of claim 1, in which the detecting comprises:
   determining a facial location of the subject;
   detecting at least one iris of the subject in response to determining the facial location;
   determining the gaze direction of the subject based at least in part on the facial location and the at least one iris; and
   estimating the future estimated time period in which at least the gaze direction of the subject is centered on the camera and/or both eyes of the subject are open.

3. The method of claim 1, in which the predetermined period of time is greater than an average blink length.

4. The method of claim 1, in which the detecting comprises:
   activating a facial recognition and an iris detection of the subject when facial movement of the subject is detected;
   estimating the future estimated time period in which the facial movement will center the gaze direction of the subject on the camera according to a velocity and a direction of the detected facial movement; and
   activating, during the future estimated time period, the facial recognition and the iris detection to verify the gaze direction of the subject is centered on the camera and/or both eyes of the subject are open before actuating the camera shutter.

5. The method of claim 1, in which the input is a timer indicating a start of the future estimated time period, and further comprising actuating the camera shutter when a facial recognition verifies the gaze direction of the subject is centered on the camera and/or an iris detection verifies that both eyes of the subject are open.

6. A camera configured for a blink and averted gaze avoidance, the camera comprising:
   a memory unit; and
   at least one processor coupled to the memory unit, the at least one processor being configured:
   to detect an averted gaze of a subject and/or at least one closed eye of the subject, in response to receiving an input to actuate a camera shutter;
   to schedule an actuation of the camera shutter to a future estimated time period based on an estimate of when a gaze direction of the subject will be centered on the camera and/or both eyes of the subject will be open, the future estimated time period provided by an artificial neural network trained on blink timing and/or averted gaze timing;
   to determine, at the future estimated time period, whether the subject has at least one closed eye; and
   to delay, at the future estimated time period, the actuation of the camera shutter for a predetermined period of time when the subject has the at least one closed eye.

7. The camera of claim 6, in which the at least one processor is further configured:
  to determine a facial location of the subject;
  to detect at least one iris of the subject in response to determining the facial location;
  to determine the gaze direction of the subject based at least in part on the facial location and the at least one iris; and
  to estimate the future estimated time period in which at least the gaze direction of the subject is centered on the camera and/or both eyes of the subject are open.

8. The camera of claim 6, in which the predetermined period of time is greater than an average blink length.

9. The camera of claim 6, in which the at least one processor is further configured:
  to activate a facial recognition and an iris detection of the subject when facial movement of the subject is detected;
  to estimate the future estimated time period in which the facial movement will center the gaze direction of the subject on the camera according to a velocity and a direction of the detected facial movement; and
  to activate, during the future estimated time period, the facial recognition and the iris detection to verify the gaze direction of the subject is centered on the camera and/or both eyes of the subject are open before actuating the camera shutter.

10. The camera of claim 6, in which:
  the input is a timer indicating a start of the future time period; and
  the at least one processor is further configured to actuate the camera shutter when a facial recognition verifies the gaze direction of the subject is centered on the camera and/or an iris detection verifies that both eyes of the subject are open.

11. An apparatus configured for a blink and averted gaze avoidance, the apparatus comprising:
  means for detecting an averted gaze of a subject and/or at least one closed eye of the subject, in response to receiving an input to actuate a camera shutter; and
  means for scheduling an actuation of the camera shutter to a future estimated time period based on an estimate of when a gaze direction of the subject will be centered on a camera and/or both eyes of the subject will be open, the future estimated time period provided by an artificial neural network trained on blink timing and/or averted gaze timing;
  means for determining, at the future estimated time period, whether the subject has at least one closed eye; and
  means for delaying, at the future estimated time period, the actuation of the camera shutter for a predetermined period of time when the subject has the at least one closed.

12. A non-transitory computer-readable medium having non-transitory program code recorded thereon for a blink and averted gaze avoidance with a camera, the program code being executed by a processor and comprising:
  program code to detect an averted gaze of a subject and/or at least one closed eye of the subject, in response to receiving an input to actuate a camera shutter;
  program code to schedule an actuation of the camera shutter to a future estimated time period based on an estimate of when a gaze direction of the subject will be centered on the camera and/or both eyes of the subject will be open, the future estimated time period provided by an artificial neural network trained on blink timing and/or an averted gaze;
  program code to determine, at the future estimated time period, whether the subject has at least one closed eye; and
  program code to delay, at the future estimated time period, the actuation of the camera shutter for a predetermined period of time when the subject has the at least one closed.

13. A method of a blink and averted gaze avoidance with a camera, comprising:
  receiving an input to actuate a camera shutter to capture an image of a subject;
  determining whether the subject has an averted gaze and/or at least one closed eye in response to the input;
  actuating the camera shutter to capture a plurality of images for a time period in response to determining that the subject has the averted gaze and/or the at least one closed eye;
  identifying, after the time period, an image from the plurality of images having a gaze direction of the subject centered on the camera and having both eyes of the subject open, the image of the plurality of images identified by an artificial neural network trained for averted gaze recognition and iris detection; and
  storing the identified image.

14. The method of claim 13, further comprises actuating the camera shutter when the gaze direction of the subject is centered on the camera and/or both eyes of the subject are open to capture and store the image of the subject.

15. The method of claim 13, further comprises deleting each image from the plurality of images having the averted gaze and/or the at least one closed eye.

16. A camera configured for a blink and averted gaze avoidance, the camera comprising:
  a memory unit; and
  at least one processor coupled to the memory unit, the at least one processor being configured:
    to receive an input to actuate a camera shutter to capture an image of a subject;
    to determine whether the subject has the averted gaze and/or at least one closed eye in response to the input;
    to actuate the camera shutter to capture a plurality of images for a time period in response to determining that the subject has the averted gaze and/or the at least one closed eye;
    to identify, after the time period, an image from the plurality of images having a gaze direction of the subject centered on the camera and having both eyes of the subject open, the image of the plurality of images identified by an artificial neural network trained for averted gaze recognition and iris detection; and
    to store the identified image.

17. The camera of claim 16, in which the at least one processor is further configured to actuate the camera shutter when the gaze direction of the subject is centered on the camera and/or both eyes of the subject are open to capture and store the image of the subject.

18. The camera of claim 16, in which the at least one processor is further configured to delete each image from the plurality of images having the averted gaze and/or the at least one closed eye.

19. An apparatus configured for a blink and averted gaze avoidance, the apparatus comprising:

means for receiving an input to actuate a camera shutter to capture an image of a subject;

means for determining whether the subject has an averted gaze and/or at least one closed eye in response to the input;

means for actuating the camera shutter to capture a plurality of images for a time period in response to determining that the subject has the averted gaze and/or the at least one closed eye;

means for identifying, after the time period, an image from the plurality of images having a gaze direction of the subject centered on a camera and having both eyes of the subject open, the image of the plurality of images identified by an artificial neural network trained for averted gaze recognition and iris detection; and means for storing the identified image.

20. A non-transitory computer-readable medium having non-transitory program code recorded thereon for a blink and averted gaze avoidance with a camera, the program code being executed by a processor and comprising:

program code to receive an input to actuate a camera shutter to capture an image of a subject;

program code to determine whether the subject has an averted gaze and/or at least one closed eye in response to the input;

program code to actuate the camera shutter to capture a plurality of images within for a time period in response to determining that the subject has the averted gaze and/or the at least one closed eye;

program code to identify, after the time period, an image from the plurality of images having a gaze direction of the subject centered on the camera and having both eyes of the subject open, the image of the plurality of images identified by an artificial neural network trained for averted gaze recognition and iris detection; and program code to store the identified image.

* * * * *